United States Patent
Seo et al.

(10) Patent No.: US 8,971,425 B2
(45) Date of Patent: Mar. 3, 2015

(54) METHOD FOR RELAYING OF RELAY HAVING MULTIPLE ANTENNA IN WIRELESS COMMUNICATION SYSTEM

(75) Inventors: Han Byul Seo, Gyeongki-do (KR); Byoung Hoon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 13/121,501

(22) PCT Filed: Oct. 13, 2009

(86) PCT No.: PCT/KR2009/005862
§ 371 (c)(1),
(2), (4) Date: Mar. 29, 2011

(87) PCT Pub. No.: WO2010/050686
PCT Pub. Date: May 6, 2010

(65) Prior Publication Data
US 2011/0176585 A1    Jul. 21, 2011

Related U.S. Application Data

(60) Provisional application No. 61/109,190, filed on Oct. 29, 2008.

(30) Foreign Application Priority Data

Dec. 15, 2008  (KR) ......................... 10-2008-0126920

(51) Int. Cl.
H04K 1/10       (2006.01)
H04L 27/28      (2006.01)
H04B 7/155      (2006.01)
H04B 7/04       (2006.01)

(52) U.S. Cl.
CPC ............ H04B 7/1555 (2013.01); *H04B 7/0413* (2013.01)
USPC ............................ 375/260; 375/211; 375/219

(58) Field of Classification Search
USPC .................... 375/211, 219, 260, 267
See application file for complete search history.

(56) References Cited

U.S. PATENT DOCUMENTS

| | | | |
|---|---|---|---|
| 8,050,618 B2 * | 11/2011 | Kwun et al. | 455/7 |
| 2005/0190821 A1 * | 9/2005 | Fujii et al. | 375/211 |
| 2007/0160014 A1 | 7/2007 | Larsson | |
| 2008/0002601 A1 | 1/2008 | Coronel et al. | |
| 2008/0080449 A1 * | 4/2008 | Huang et al. | 370/342 |
| 2010/0039928 A1 * | 2/2010 | Noh et al. | 370/210 |
| 2010/0274556 A1 * | 10/2010 | Sato et al. | 704/201 |

FOREIGN PATENT DOCUMENTS

WO     2005/064872     7/2005

OTHER PUBLICATIONS

International Search Report from PCT/KR2009/005862.

* cited by examiner

*Primary Examiner* — Freshteh N Aghdam
(74) *Attorney, Agent, or Firm* — Morgan, Lewis & Bockius LLP (57) ABSTRACT

A method for relaying performed by a relay station is provided. The method includes receiving a signal from a source station through at least one receive antenna, defining a connection structure between the at least one receive antenna and at least one transmit antenna, processing the signal by using a midcoding matrix, and transmitting the processed signal to a destination station through the at least one transmit antenna. Quality of signal transmission can be enhanced.

6 Claims, 4 Drawing Sheets

Precoding Matrix Set    Midcoding Matrix Set

Fig. 8

METHOD FOR RELAYING OF RELAY HAVING MULTIPLE ANTENNA IN WIRELESS COMMUNICATION SYSTEM

The present application is a national stage of PCT International Application No. PCT/KR2009/005862, filed Oct. 13, 2009, and claims the benefit of U.S. Provisional Application No. 61/109,190, filed Oct. 29, 2008. The present national stage application also claims the benefit of Korean Patent Application No. 10-2008-0126920, filed Dec. 15, 2008.

TECHNICAL FIELD

The present invention relates to wireless communications, and more particularly, to a wireless communication system employing a relay station having multiple antennas.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, in the IEEE 802.16 Task Group j (hereinafter, IEEE 802.16j) based on IEEE 802.16e, a relay station (RS) is introduced to provide coverage extension and throughput enhancement, and a standardization thereof is being carried out. That is, according to the IEEE 802.16j standard, a signal can be delivered to a mobile station (MS) located outside a coverage of a base station (BS) via the RS, and a high-quality path employing high-level adaptive modulation and coding (AMC) can be configured for an MS located inside the coverage of the BS, thereby increasing system capacity with the same radio resource.

A representative operation mode in which the RS relays a signal between the BS and the MS includes an amplify-and-forward (AF) mode and a decode-and-forward (DF) mode. In the AF mode, a signal received from the BS or the MS is amplified and is then delivered to the MS or the BS. In the DF mode, information is restored by performing demodulation, decoding, or the like on the signal received from the BS or the MS, and thereafter a signal is generated by performing coding, modulation, or the like and is then delivered to the MS or the BS.

The AF mode has an advantage in that a time delay is short in signal delivery, but has a disadvantage in that noise is propagated or amplified in the delivered signal. On the other hand, the DF mode has an advantage in that noise can be removed from the signal, and reliability of signal transmission can be enhanced, but has a disadvantage in that a time delay may occur in signal delivery since a demodulation and decoding process is performed.

A multiple input multiple output (MIMO) system is a communication system using a plurality of transmit (Tx)/receive (Rx) antennas. The MIMO system can linearly increase channel capacity without additional increase of a frequency bandwidth when the number of Tx/Rx antennas increases. The MIMO technique includes a spatial diversity technique in which a symbol which has passed various channel paths is used to enhance transmission reliability and a spatial multiplexing technique in which a plurality of Tx antennas are used so that respective antennas simultaneously transmit separate data streams to increase a transfer rate.

For channel capacity increase and transmission reliability enhancement, an RS employing multiple antennas can be taken into consideration. When the RS operates according to the DF mode, a signal is received from a source station through multiple Rx antennas, and transmits a restored signal to a destination station through multiple Tx antennas. In this case, the conventional MIMO technique can be properly applied to the Rx antennas and the Tx antennas.

Unlike this, when the RS operates according to the AF mode, a connection relation between an Rx antenna and a Tx antenna is not clearly defined. Accordingly, there is a problem in that the conventional MIMO technique cannot be directly applied.

DISCLOSURE OF INVENTION

Technical Problem

The present invention provides a method for performing a relay operation by properly controlling a connection relation between a transmit antenna and a receive antenna when multiple antennas are applied to a relay station operating in an amplify and forward (AF) mode.

Solution to Problem

According to an aspect of the present invention, a method for relaying performed by a relay station is provided. The method includes receiving a signal from a source station through at least one receive antenna, defining a connection structure between the at least one receive antenna and at least one transmit antenna, processing the signal by using a midcoding matrix, and transmitting the processed signal to a destination station through the at least one transmit antenna.

According to another aspect of the present invention a relay station is provided. The relay station includes a controller for regulating a midcoding matrix defining a connection structure between at least one receive antenna and at least one transmit antenna, and a data processor for processing a signal received from a source station through the at least one receive antenna by using the midcoding matrix.

Advantageous Effects of Invention

When multiple antennas are applied to a relay station operating in an amplify and forward (AF) mode, an internal connection relation of the relay station is properly controlled so that an overall channel state is satisfactorily set. Accordingly, quality of signal transmission can be enhanced.

MODE FOR THE INVENTION

Hereinafter, exemplary embodiments of the present invention will be described in detail with reference to the accompanying drawings.

Figure 1:
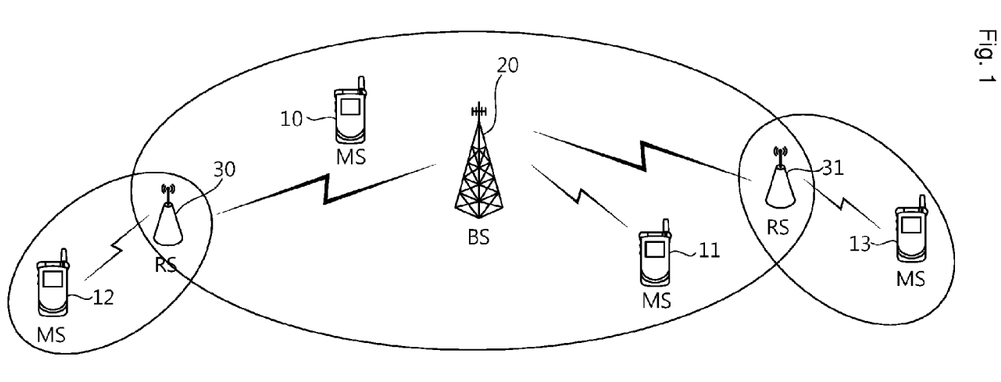
FIG. 1 is a diagram showing a wireless communication system using a relay station.

FIG. 1 is a diagram showing a wireless communication system using a relay station.

The wireless communication system can be widely deployed to provide a variety of communication services, such as voices, packet data, etc.

Referring to FIG. 1, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B (NB), a base transceiver system (BTS), an access point, etc. One or more cells may exist for one BS 20. The RSs 30 and 31 are provided for coverage extension or data rate improvement resulted from a diversity effect, and are located between the MS and the BS. That is, the MSs 10 and 11 located inside a coverage of the BS 20 can directly communicate with the BS 20, and the MSs 12 and 13 located outside the coverage of the BS 20 communicate with the BS 20 via the RSs 30 and 31. Alternatively, for the data rate improvement resulted from the diversity effect, even the MSs 10 and 11 located inside the coverage of the BS 20 may communicate with the BS 20 via the RSs 30 and 31.

Hereinafter, a downlink (DL) denotes a communication link from the BS 20 to the MS 10, and an uplink (UL) denotes a communication link from the MS 10 to the BS 20. In the DL, a source station is the BS 20, and a destination station is the MS 10. In the UL, the source station is the MS 10, and the destination station is the BS 20. In the DL, a transmitter may be a part of the BS 20, and a receiver may be a part of the MS 10. In the UL, the transmitter may be a part of the MS 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

A representative operation mode of the RS includes a decode-and-forward (DF) mode and an amplify-and-forward (AF) mode. According to the DF mode, a wireless RS restores transmission information by performing various processes (e.g., demodulation, channel decoding, error checking, etc.) on a signal received from a source station, and thereafter delivers a signal generated by channel coding and modulation to a destination station. According to the AF mode, the wireless RS amplifies a signal received from the source station, and thereafter delivers the amplified signal to the destination station. The AF mode is classified into two types. In a first type of the AF mode, a signal received from the source station is stored for a specific time, and thereafter the signal is amplified and then delivered to the destination station. The second type of the AF mode is a simple repeater type in which the signal received from the source station is not stored but is directed amplified and delivered to the destination station.

The DF mode has an advantage in that noise can be removed, and reliability of signal transmission can be enhanced since errors can be checked. Further, advantageously, a channel coding and modulation scheme can be modified by the RS. However, the DF mode has a disadvantage in that a time delay may occur. On the other hand, the AF mode has an advantage in that an operation of the RS is simple, and a time delay can be reduced. Between the two types of the AF mode, the repeater-type AF mode does not produce a time delay in a medium access control (MAC) layer since a received signal is delivered to the destination station within a cyclic prefix (CP) of OFDM. Further, in the AF mode, the received signal is delivered after being stored for a specific time, and a time delay is shorter than that in the DF mode. However, the AF mode has a disadvantage in that noise included in a signal cannot be removed, and errors cannot be checked.

A single antenna is assumed in the conventional techniques related to an RS. However, the RS needs to employ multiple antennas to achieve channel capacity increase and reliability enhancement of a wireless channel.

The conventional multiple input multiple output (MIMO) technique can be properly applied to an RS operating according to a DF mode. On the other hand, the conventional MIMO technique cannot be simply applied to an RS operating according to an AF mode. That is, in the RS operating according to the AF mode, a signal of each receive (Rx) antenna is connected to each transmit (Tx) antenna, but there has been no practical method for establishing this connection. There is a proposed method for optimizing an object function given on the basis of a channel state of a link between a source station and an RS and a link between the RS and a destination station. Since this method assumes that a channel of each link is separated it is difficult to apply this method in a real situation.

In case of the RS operating according to the AF mode, a connection structure between an Rx antenna and a Tx antenna is one of factors of determining a final channel between the source station and the destination station. Therefore, when the connection structure is not properly configured, a final channel state may be unsatisfactory even if the channel state of the link between the source station and the RS and the link between the RS and the destination station is satisfactory. Accordingly, there is a need to propose a new method for an RS having multiple antennas and operating according to the AF mode. In particular, if a simple repeater-type RS is used among RSs operating according to the AF mode, the RS cannot recognize the channel state of the link between the source station and the RS and the link between the RS and the destination state and thus cannot perform a proper operation for the recognition result.

Accordingly, a problem arises when the RS having multiple antennas operates according to the AF mode.

Figure 2:
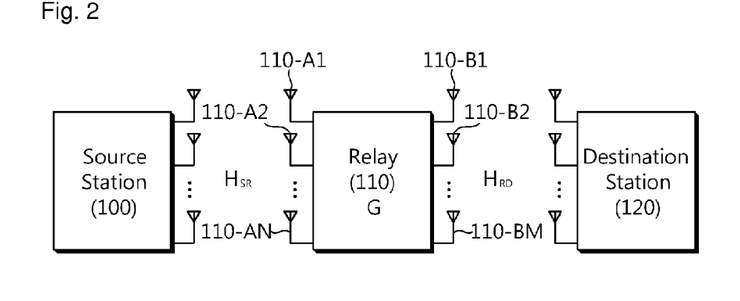
FIG. 2 is a block diagram showing a communication channel of a wireless communication system having multiple antennas according to an embodiment of the present invention.

FIG. 2 is a block diagram showing a communication channel of a wireless communication system having multiple antennas according to an embodiment of the present invention.

Referring to FIG. 2, a source station 100, an RS 110, and a destination station 120 have multiple antennas. In uplink transmission, the source station 100 is an MS, and the destination station 120 is a BS. In downlink transmission, the source station 100 is a BS, and the destination station 120 is an MS. The RS 110 is assumed to be an RS operating according to an AF mode.

A channel matrix of a link between the source station 100 and the RS 110 (i.e., an S-R link) is indicated by HSR. A channel matrix of a link between the RS 110 and the destination station 120 (i.e., an R-D link) is indicated by HRD. A channel matrix that defines a connection structure between Rx antennas 110-A1, 110-A2, ..., 110-AN and Tx antennas 110-B1, 110-B2, ..., 110-BM is indicated by G, and these antennas are internally connected in the RS 110. Hereinafter, the channel matrix G is referred to as a midcoding matrix.

Figure 3:
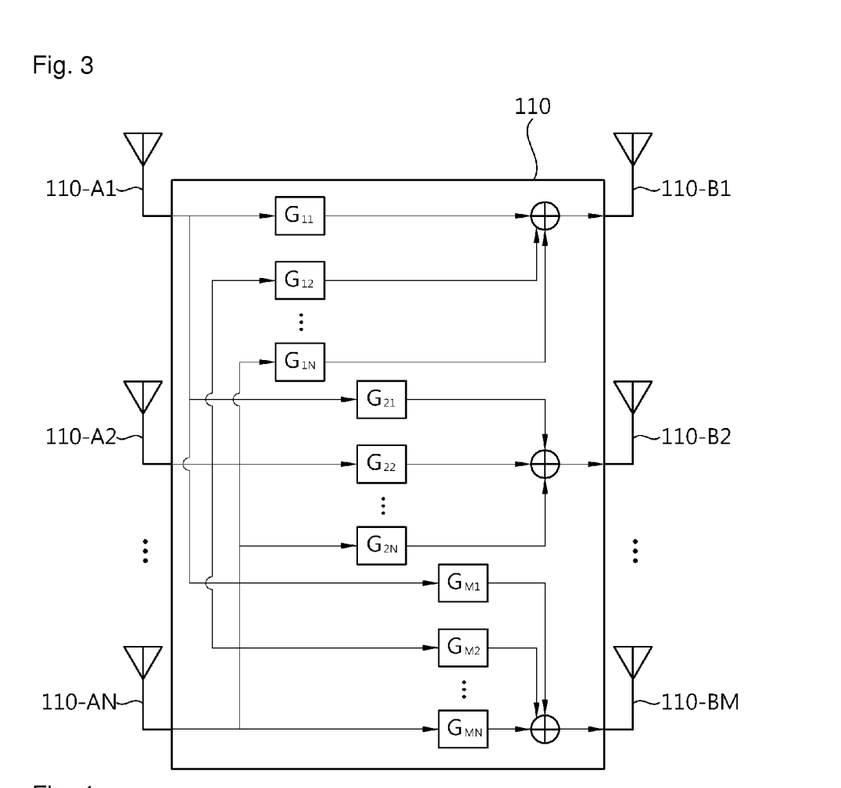
FIG. 3 shows a structure in which multiple antennas are internally connected in a relay station according to an embodiment of the present invention.

FIG. 3 shows a structure in which multiple antennas are internally connected in an RS according to an embodiment of the present invention. The same reference numerals as those in FIG. 2 will be used in the following description to denote the same elements.

Referring to FIG. 3, the RS has N Rx antennas and M Tx antennas. A signal received by the Rx antenna is multiplied by a midcoding matrix G, and is then delivered to the Tx antenna. More specifically, Rx signals of the respective Rx antennas 110-A1, 110-A2, ..., 110-AN are multiplied by respective components $G_{11}, G_{12}, \ldots, G_{1N}$ of the midcoding matrix G, and then a signal obtained by summing the multiplication results is delivered to the Tx antenna 110-B1. Further, Rx signals of the respective Rx antennas 110-A1, 110-A2, ..., 110-AN are multiplied by respective components $G_{21}, G_{22}, \ldots, G_{2N}$ of the midcoding matrix G, and then a signal obtained by summing the multiplication results is delivered to the Tx antenna 110-B2. As such, Rx signals of the respective Rx antennas 110-A1, 110-A2, ..., 110-AN are multiplied by respective components $G_{M1}, G_{M2}, \ldots, G_{MN}$ of the midcoding matrix G, and then a signal obtained by summing the multiplication results is delivered to the Tx antenna 110-BM.

Accordingly, by regulating the midcoding matrix G, an amplitude and phase of a signal delivered to each of the Tx antennas 110-B1, 110-B2, ..., 110-BM can be regulated.

Equation 1 below shows an Rx signal y received by the destination station 120 via the RS 110 having multiple antennas.

MathFigure 1

$$y = H_{RD}G(H_{SR}Fx + n_R) + n_D = H_{RD}GH_{SR}Fx + H_{RD}Gn_R + n_D \quad [\text{Math.1}]$$

Herein, $H_{SR}$ denotes a channel matrix between the source station 100 and the RS 110, $H_{RD}$ denotes a channel matrix between the RS 110 and the destination station 120, x denotes a Tx signal transmitted from the source station 100, F denotes a precoding matrix of the source station 100, $n_R$ denotes noise to be added in the RS 110, and $n_D$ denotes noise to be added in the destination station 120.

The RS 110 may operate in a full frequency band or a specific frequency band. That is, matrices of Equation 1 may represent a full frequency band used by the source station, the RS, and the destination station, or may represent a specific frequency band. When representing the specific frequency band, the source station and the RS may use a different precoding matrix and a different midcoding matrix for each specific frequency band.

As shown in Equation 1, the Tx signal x is influenced not only by $H_{SR}$ which is a channel matrix of an S-R link and $H_{RD}$ which is a channel matrix of an R-D link but also by a midcoding matrix G. Therefore, by properly regulating the midcoding matrix G, a channel state experienced by the Tx signal x from the source station to the destination station can be satisfactorily configured. In particular, since a suitable midcoding matrix G differs according to a channel of the S-R link and a channel of the R-D link, the midcoding matrix G can be regulated by considering a channel state of the S-R link and a channel state of the R-D link.

Figure 4:
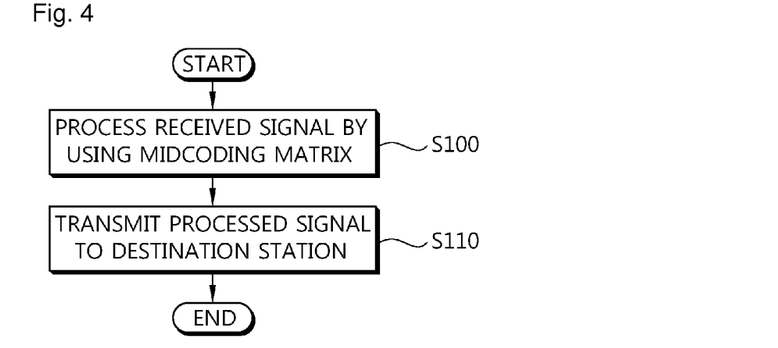
FIG. 4 is a flowchart showing a relay method for a relay station having multiple antennas according to an embodiment of the present invention.

FIG. 4 is a flowchart showing a relay method for an RS having multiple antennas according to an embodiment of the present invention. It is assumed that the RS has at least one Rx antenna and at least one Tx antenna, and operates according to an AF mode.

Referring to FIG. 4, the RS processes a signal received from a source station by using a midcoding matrix G (step S100). The midcoding matrix defines a connection structure between at least one Rx antenna and at least one Tx antenna of the RS. The midcoding matrix may be changed according to a specific rule. For example, the RS may arbitrarily change the midcoding matrix over time. In addition, the RS may change the midcoding matrix upon receiving a message for requesting a change of the midcoding matrix from the source station or a destination station. A method for regulating the midcoding matrix will be described below in detail.

The RS can receive a signal from the source station by using the at least one Rx antenna. For example, signals received by respective Rx antennas are multiplied by respective components $G_{11}, G_{12}, \ldots, G_{1N}$ of the midcoding matrix G, and the multiplication results are summed. Further, the signals are multiplied by respective components $G_{21}, G_{22}, \ldots, G_{2N}$ of the midcoding matrix G, and the multiplication results are summed. Further, the signals are multiplied by respective components $G_{M1}, G_{M2}, \ldots, G_{MN}$ of the midcoding matrix G, and the multiplication results are summed. Herein, N denotes the number of Rx antennas of the RS, and M denotes the number of Tx antennas of the RS.

In this case, the RS can process all signals received from the source station by using the midcoding matrix. That is, by applying the midcoding matrix which is changed over time to a pilot signal (or a reference signal) received from the source station, the destination station can know an effect of changing the midcoding matrix over time.

The RS transmits the signal processed in step S100 to the destination station (step S110). The RS can transmit the signal by using the at least one Tx antenna. For example, signals received from respective Rx antennas may be multiplied by respective components $G_{11}, G_{12}, \ldots, G_{1N}$ of the midcoding matrix G, and a signal obtained by summing the multiplication results may be transmitted to the destination station through a first Tx antenna. Further, the signals may be multiplied by respective components $G_{21}, G_{22}, \ldots, G_{2N}$ of the midcoding matrix G, and a signal obtained by summing the multiplication results may be transmitted to the destination station through a second Tx antenna. Further, the signals may be multiplied by respective components $G_{M1}, G_{M2}, \ldots, G_{MN}$ of the midcoding matrix G, and a signal obtained by summing the multiplication results may be transmitted to the destination station through an Mth Tx antenna.

The destination station can measure a channel state of a composite channel on the basis of a signal received from the RS. The composite channel is configured by considering a precoding matrix F, a channel $H_{SR}$ between the source station and the RS, a midcoding matrix G, and a channel $H_{RS}$ between the RS and the destination station. The composite channel may also be referred to as an effective channel. The destination station may feed back channel information depending on the channel state to the source station. The source station may perform scheduling on the basis of the channel information, and may determine a precoding matrix. The channel information may be a composite channel matrix, a modulation and coding scheme (MCS) level which can be obtained using the composite channel matrix, a channel quality indicator (CQI), a signal to noise ratio (SNR), a signal to interference and noise ratio (SINR), etc.

The source station performs scheduling on the basis of the channel information depending on the channel state of the composite channel. Therefore, by properly regulating the midcoding matrix G which has an effect on the channel state of the composite channel, the source station can effectively perform scheduling.

Hereinafter, a method for regulating the midcoding matrix G will be described. The midcoding matrix G may be arbitrarily regulated by the RS, or may be regulated by receiving a control signal from the source station or the destination station.

Figure 5:
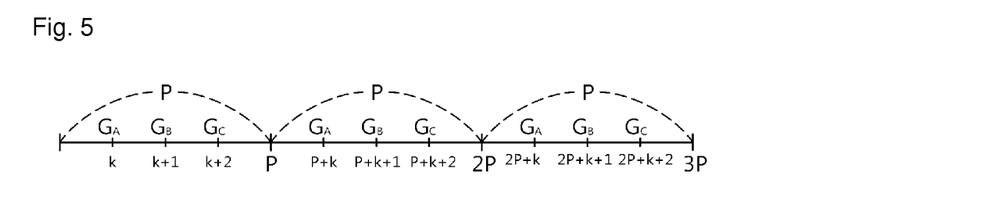
FIG. 5 shows a method for regulating a midcoding matrix by a relay station according to an embodiment of the present invention.

FIG. 5 shows a method for regulating a midcoding matrix by an RS according to an embodiment of the present invention.

Referring to FIG. 5, a midcoding matrix G may be arbitrarily changed by the RS. That is, the RS may randomly change the midcoding matrix G over time. For example, the midcoding matrix G may be changed to $G_A$ at a time k, to $G_B$ at a time K+1, and to $G_C$ at a time K+2.

In addition, the RS may periodically repeat a pattern of changing the midcoding matrix. That is, if P denotes a repetition period for the pattern of changing the midcoding matrix, the midcoding matrix used at a time t may be used by the RS at a time k+P and at a time k+2P, and the midcoding matrix used at a time k+1 may be used by the RS at a time k+1+P and at a time k+1+2P. For example, a midcoding matrix $G_A$ may be used at times k, k+P, and k+2P, a midcoding matrix $G_B$ may be used at times k+1, k+1+P, and k+1+2P, and a midcoding matrix $G_C$ may be used at times k+2, k+2+P, and k+2+2P.

As shown in FIG. 5, when the RS periodically repeats the pattern of changing the midcoding matrix, the source station can easily perform scheduling. That is, the source station may receive a feedback of channel information from each destination state, and perform scheduling on the basis of the channel information. In this case, if the RS periodically repeats the pattern of changing the midcoding matrix which randomly varies, the source station may receive a feedback of channel information from each destination station and then predict a channel state of a next period for each destination station. The source station may perform scheduling on the destination station on the basis of the predicted channel state. In addition thereto, a suitable precoding matrix can be determined on the basis of the channel state. For example, if the source station receives a feedback of suitable channel information from a specific destination station at times k, k+P and k+2P, the source station may perform scheduling to transmit a signal to the specific destination station at a time k+3P, and may determine the suitable precoding matrix.

For this, a repetition period P for the pattern of changing the midcoding matrix may be shared by the source station, the RS, and the destination station. For example, the repetition period may be set by the source station, and then may be transmitted to the RS and/or the destination station. The RS applies midcoding which varies over time to all signals including a pilot signal (i.e., a reference signal) transmitted from the source station. Thus, the destination station can observe a whole effective channel including a change effect of the midcoding matrix in a process of channel estimation. The midcoding matrix needs to be changed slowly enough so that each destination station can correctly estimate a channel state at a specific time. A probability of receiving a service increases when an optimal midcoding matrix is used.

Meanwhile, the period P by which the pattern of changing the midcoding matrix is repeated in the RS may be in association with a period Q by which the pattern of changing the precoding matrix is repeated in the source station. That is, the period and the period Q may be set to be different from each other, so that the midcoding matrix and the precoding matrix can be variously combined. A mechanism for associating the period P and the period Q may be determined by at least one of a channel change speed between the source station and the RS, a channel change speed between the RS and the destination station, and a channel change speed between the source station and the destination station.

For example, a precoding matrix may be changed once in every period P. It is assumed herein that a channel between the source station and the RS and a channel between the RS and the destination station (hereinafter, referred to as a propagation channel) are fixed. If A precoding matrices are used in total, a composite channel from the source station to the destination station is changed over time, and a pattern of changing the composite channel may be repeated every period PA. Therefore, even if the propagation channel is almost not changed or is changed very slowly, the destination stations communicating with the source station via the RS can recognize that the channel is changed fast.

In another example, the midcoding matrix may be changed once in every period Q. When it is assumed that the propagation channel is fixed, if B midcoding matrices are used in total, a pattern of changing the composite channel may be repeated every period QB. In this case, the number of midcoding matrices used by each RS in one cell and the number of midcoding matrix sets may be equal to or different from each other.

According to the aforementioned two examples, the destination stations communicating with the source station via the RS may experience more types of channels than a destination station directly communicating with the source station. That is, since the destination stations communicating with the source station via the RS can experience various channel combinations, scheduling can be performed more precisely.

Figure 6:
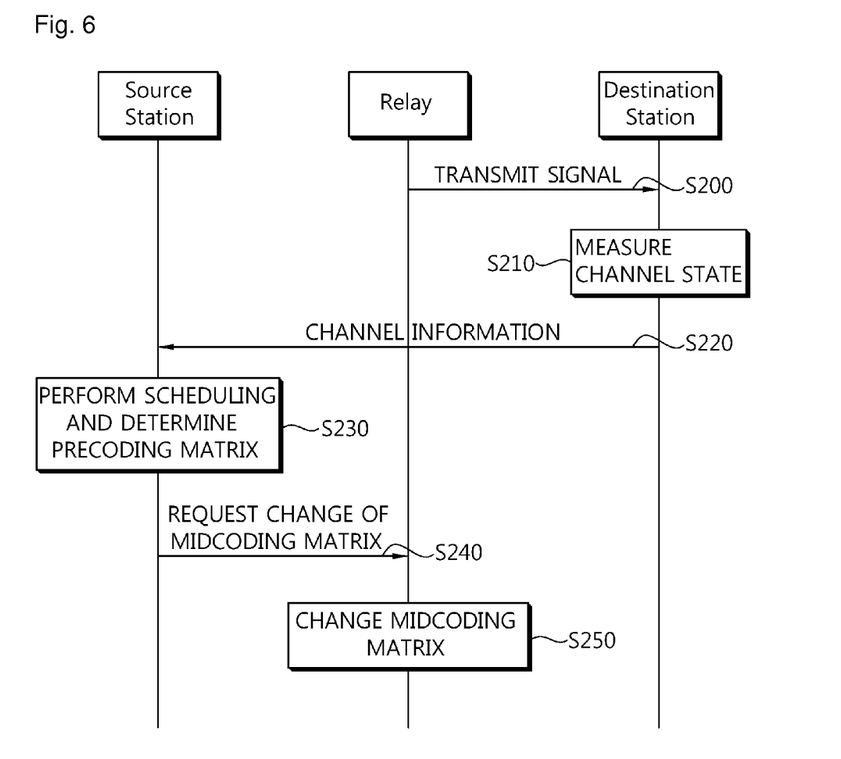
FIG. 6 is a flowchart showing a method for regulating a midcoding matrix according to an embodiment of the present invention.

FIG. 6 is a flowchart showing a method for regulating a midcoding matrix according to an embodiment of the present invention. It is assumed that an RS has at least one Rx antenna and at least one Tx antenna, and operates according to an AF mode.

Referring to FIG. 6, the RS transmits to a destination station a signal received from a source station (step S200), and the destination station measures a channel state on the basis of the signal received from the RS (step S210). Herein, the channel state corresponds to a channel state of a composite channel. The composite channel is configured by considering a precoding matrix F, a channel $H_{SR}$ between the source station and the RS, a midcoding matrix G, and a channel $H_{RD}$ between the RS and the destination station. The composite channel may also be referred to as an effective channel.

The destination station feeds back channel information regarding the channel state to the source station (step S220). The source station performs scheduling on the basis of the channel information, and determines a precoding matrix (step S230). The channel information may be a composite channel matrix, a modulation and coding scheme (MCS) level which can be obtained using the composite channel matrix, a channel quality indicator (CQI), a signal to noise ratio (SNR), a signal to interference and noise ratio (SINR), etc. This is for exemplary purposes only, and thus the destination station may perform scheduling on the basis of the channel information, determine the precoding matrix, and transmit the determination result to the source station.

The source station transmits a message for requesting a change of the midcoding matrix G to the RS by using the channel information received in step S220 (step S240). For example, if it is determined that a channel state is unsatisfactory with respect to a specific destination station, the source station may request the RS to change the midcoding matrix G. In this case, the source station may explicitly specify a suitable midcoding matrix.

Upon receiving the message, the RS changes the midcoding matrix (step S250). If the source station explicitly specifies a specific midcoding matrix, the RS can change the specified midcoding matrix. If the specific midcoding matrix is not explicitly specified in the message, the RS can arbitrarily change the midcoding matrix. That is, the RS may change the midcoding matrix randomly, or may change the midcoding matrix to another midcoding matrix having a specific correlation with a midcoding matrix currently in use. For example, the midcoding matrix may be changed to a new midcoding matrix by considering a similarity or difference with respect to the midcoding matrix currently in use. The similarity or difference with respect to the midcoding matrix currently in use can be determined according to an orthogonality between midcoding matrices or a distance between the midcoding matrices. The distance between the midcoding matrices may be defined as a Fubini-study distance, a Chordal distance, etc.

The RS may change the midcoding matrix by associating the midcoding matrix with a precoding matrix of the source station. That is, the destination station may persistently feed back channel information such as an SNR of an effective channel to the source station and/or the RS, and the source station and the RS may iteratively search for a combination of a precoding matrix and a midcoding matrix which have an optimal channel state.

Figure 7:
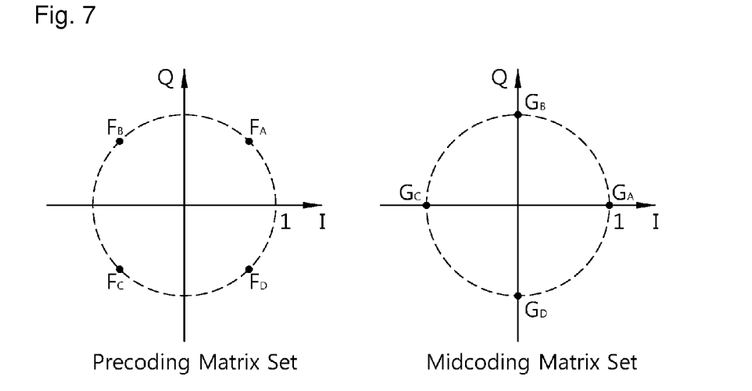
FIG. 7 shows a method for finding a combination of a precoding matrix and a midcoding matrix according to an embodiment of the present invention.

FIG. 7 shows a method for finding a combination of a precoding matrix and a midcoding matrix according to an embodiment of the present invention.

Referring to FIG. 7, a precoding matrix set which can be selected by a source station includes four precoding matrices $F_A$, $F_B$, $F_C$, and $F_D$, and a midcoding matrix which can be selected by an RS includes four midcoding matrices $G_A$, $G_B$, $G_C$, and $G_D$.

The source station and the RS can find an optimal combination by considering a channel state depending on the combination of the precoding matrix and the midcoding matrix. That is, while receiving a feedback of information indicating tendency of increase or decrease in an SNR of an effective channel, an optimal combination can be adaptively and gradually found by substituting one-by-one a matrix which is most similar to a matrix currently in use. For example, if a combination of a midcoding matrix and a precoding matrix currently in use is $\{F_A,G_A\}$, an optimal combination can be found in the order of $\{F_A,G_B\}$, $\{F_A,G_C\}$, $\{F_A,G_D\}$, $\{F_B,G_A\}$, and $\{F_B,G_B\}$. Alternatively, if the combination of the midcoding matrix and the precoding matrix currently in use is $\{F_A, G_A\}$, the optimal combination can be found in the order of $\{F_B,G_A\}$, $\{F_C,G_A\}$, $\{F_D,G_A\}$, $\{F_A,G_B\}$, $\{F_B,G_B\}$, $\{F_C,G_B\}$, and $\{F_D,G_B\}$. As such, if precoding matrices and midcoding matrices can be expressed by direction vectors along one circumference about an origin, an optimal combination can be gradually found by changing a direction by one step in a direction of increasing an SNR of an adjacent direction vector. The adjacent direction vector may rotate clockwise or counterclockwise by one step from a direction vector currently in use.

Figure 8:
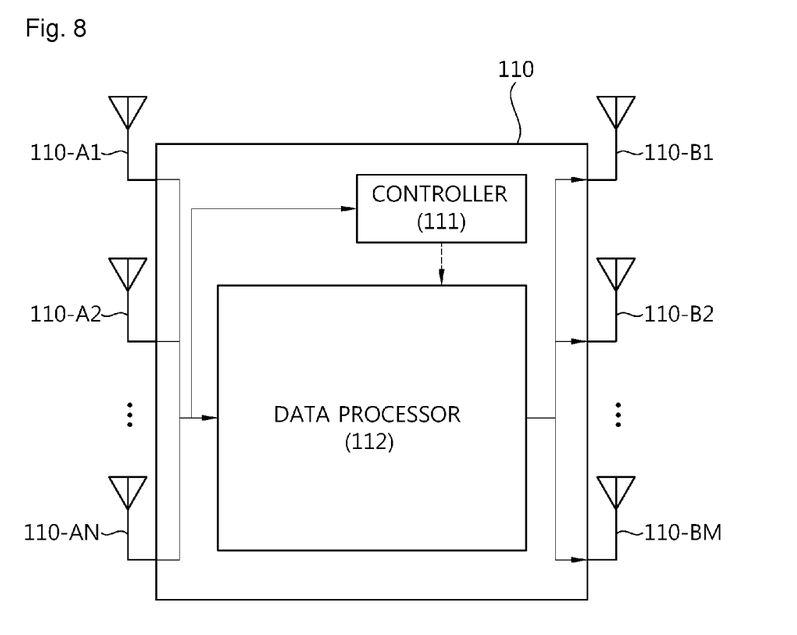
FIG. 8 is a block diagram showing a relay station supporting a relay method according to an embodiment of the present invention.

FIG. 8 is a block diagram showing an RS supporting a relay method according to an embodiment of the present invention. It is assumed that the RS has at least one Rx antenna and at least one Tx antenna, and operates according to an AF mode.

Referring to FIG. 8, an RS 110 includes a controller 111 and a data processor 112. The controller 111 regulates a midcoding matrix. The data processor 112 processes a signal by using the midcoding matrix regulated by the controller 111. For example, the controller 111 may arbitrarily change the midcoding matrix over time. In addition, the midcoding matrix may be changed upon receiving a control signal from a source station or a destination station.

The invention claimed is:

1. A method for relaying performed by a relay station, the method comprising:
   receiving a signal from a source station through at least one receive antenna;
   processing the signal by using a midcoding matrix for defining a connection structure between the at least one receive antenna and at least one transmit antenna, and, the midcoding matrix being changed according to a specific rule; and
   transmitting the processed signal to a destination station through the at least one transmit antenna,
   wherein the midcoding matrix is changed when the relay station receives a message for requesting a change of the midcoding matrix from the source station,
   wherein the midcoding matrix is changed by the relay station in association with a change of a precoding matrix of the source station to find a combination of the midcoding matrix and the precoding matrix, and
   wherein, when the precoding matrix and the midcoding matrix are expressed by direction vectors along a circumference from an origin, the combination is found by a clockwise or counterclockwise rotation.

2. The method of claim 1, wherein the midcoding matrix is changed to a midcoding matrix specified by the message.

3. The method of claim 1, wherein the midcoding matrix currently in use is similar to or different from the midcoding matrix to be changed to.

4. The method of claim 3, wherein the similarity or the difference is determined by at least one of an orthogonality, a Fubini-study distance, and a Chordal distance.

5. The method of claim 1, wherein the midcoding matrix is changed according to a channel state between the source station and the destination station.

6. A relay station, comprising:
   a controller for regulating a midcoding matrix defining a connection structure between at least one receive antenna and at least one transmit antenna; and
   a data processor for processing a signal received from a source station through the at least one receive antenna by using the midcoding matrix,
   wherein the midcoding matrix is changed when the relay station receives a message for requesting a change of the midcoding matrix from the source station, wherein the midcoding matrix is changed by the relay station in association with a change of a precoding matrix of the source station to find a combination of the midcoding matrix and the precoding matrix, and wherein, when the precoding matrix and the midcoding matrix are expressed by direction vectors along a circumference from an origin, the combination is found by a clockwise or counterclockwise rotation.

* * * * *